(12) United States Patent
Herrera

(10) Patent No.: US 7,824,722 B2
(45) Date of Patent: Nov. 2, 2010

(54) SADDLE AND SHEETING HEAD USING THE SAME

(75) Inventor: Michael Herrera, Los Alamitos, CA (US)

(73) Assignee: Casa Herrera, Inc., Pomona, CA (US)

( * ) Notice: Subject to any disclaimer, the term of this patent is extended or adjusted under 35 U.S.C. 154(b) by 853 days.

(21) Appl. No.: 11/616,732

(22) Filed: Dec. 27, 2006

(65) Prior Publication Data

US 2007/0122517 A1    May 31, 2007

Related U.S. Application Data

(62) Division of application No. 10/325,369, filed on Dec. 20, 2002, now Pat. No. 7,156,644.

(51) Int. Cl.
*A21C 3/02* (2006.01)
(52) U.S. Cl. ...................... 426/502; 426/517
(58) Field of Classification Search ................ 426/496, 426/502–503, 512, 517; 425/363, 367, 472, 425/239, 502, 517
See application file for complete search history.

(56) References Cited

U.S. PATENT DOCUMENTS

| | | | |
|---|---|---|---|
| 2,513,541 A | 7/1950 | Winegar et al. | |
| 2,693,154 A | 11/1954 | Appleton | |
| 3,570,054 A | 3/1971 | Seanor et al. | |
| 3,740,177 A | 6/1973 | Hoyt et al. | |
| 3,985,488 A | 10/1976 | Hoffmann | |
| 4,647,467 A * | 3/1987 | Pinto | 426/502 |
| 5,180,593 A | 1/1993 | Mistretta et al. | |
| 5,558,885 A * | 9/1996 | Herrera | 425/363 |
| 6,174,556 B1 * | 1/2001 | Bornhorst et al. | 426/503 |
| 6,589,580 B1 * | 7/2003 | Thakar et al. | 426/310 |
| 7,156,644 B2 * | 1/2007 | Herrera | 425/363 |

* cited by examiner

*Primary Examiner*—Drew E Becker
(74) *Attorney, Agent, or Firm*—Myers Andras Sherman LLP; Joseph C. Andras

(57) ABSTRACT

A saddle for a sheeting head includes a pair of semi-circular concave edges configured to seal a pair of rollers. The oppositely facing concave edges each include a tongue that fits in a corresponding groove in the roller and a retracted concave edge adapted to wrap around half the roller surface. The saddle includes a top portion wherein the concave edges downwardly converge, and a bottom portion wherein the concave edges downwardly diverge. A narrow waist is provided at the proximal-most position of the concave edges and adapted to fit in a pinch point between the rollers. A sheeting head assembly incorporating the saddle may include a sidewall to which the saddle need not be fastened. The self-locking characteristics of the saddle enable an assembly to omit sidewalls altogether.

3 Claims, 5 Drawing Sheets

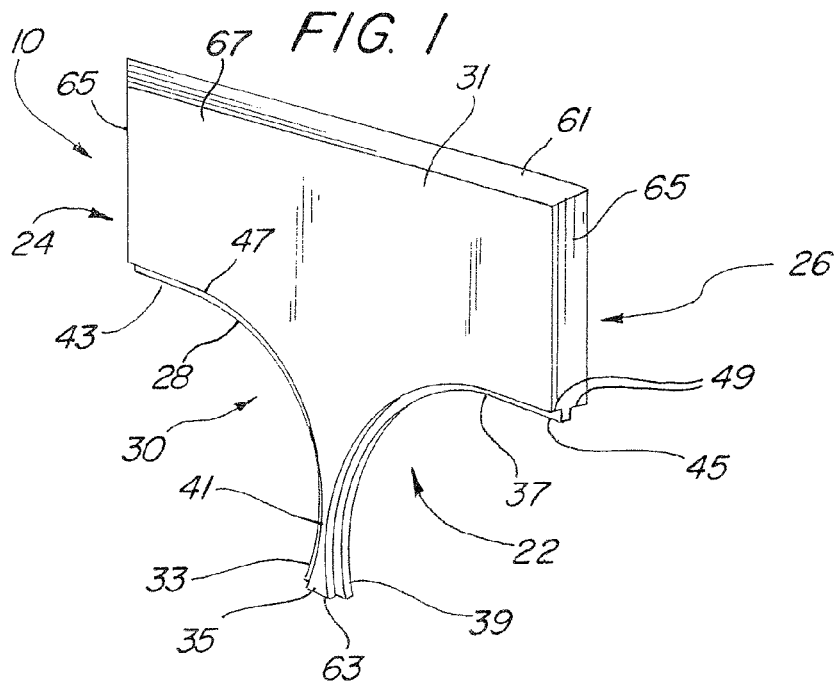
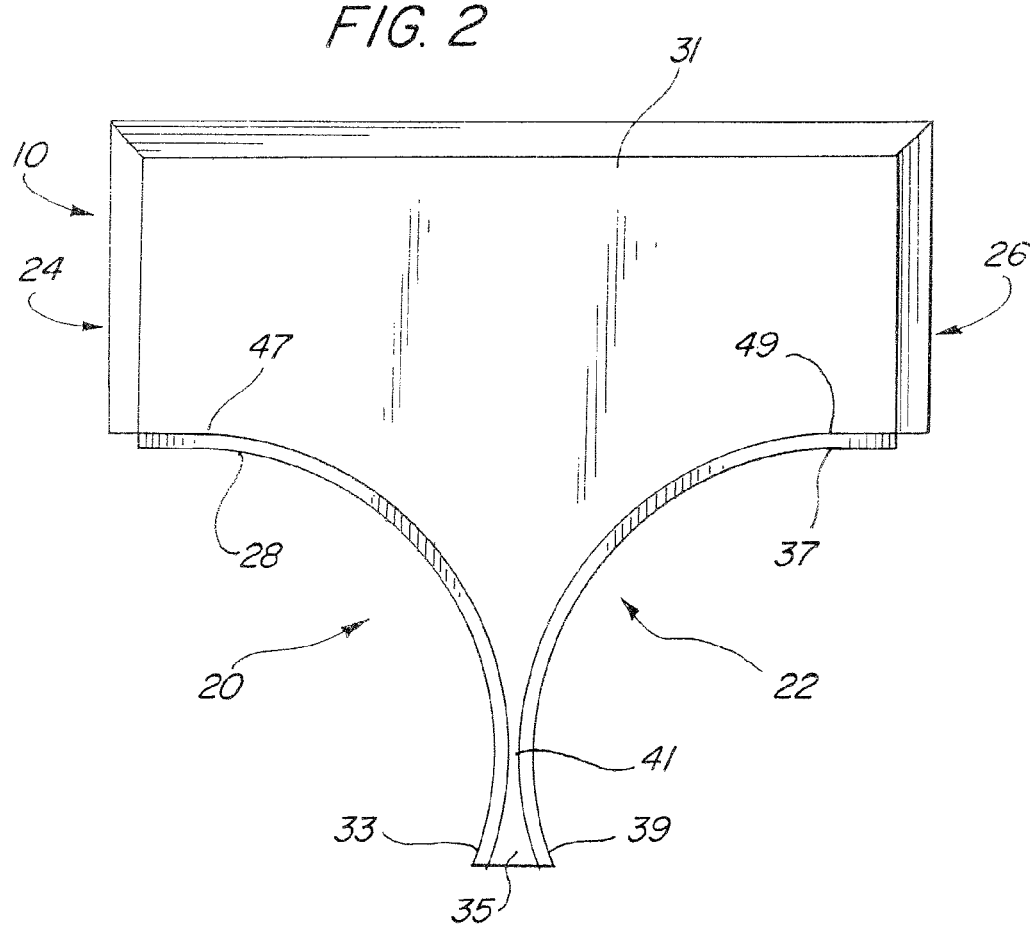

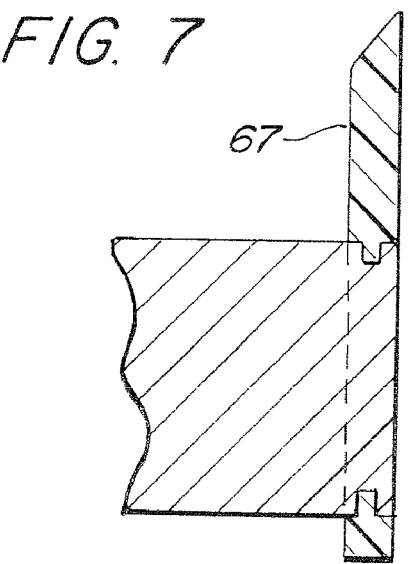
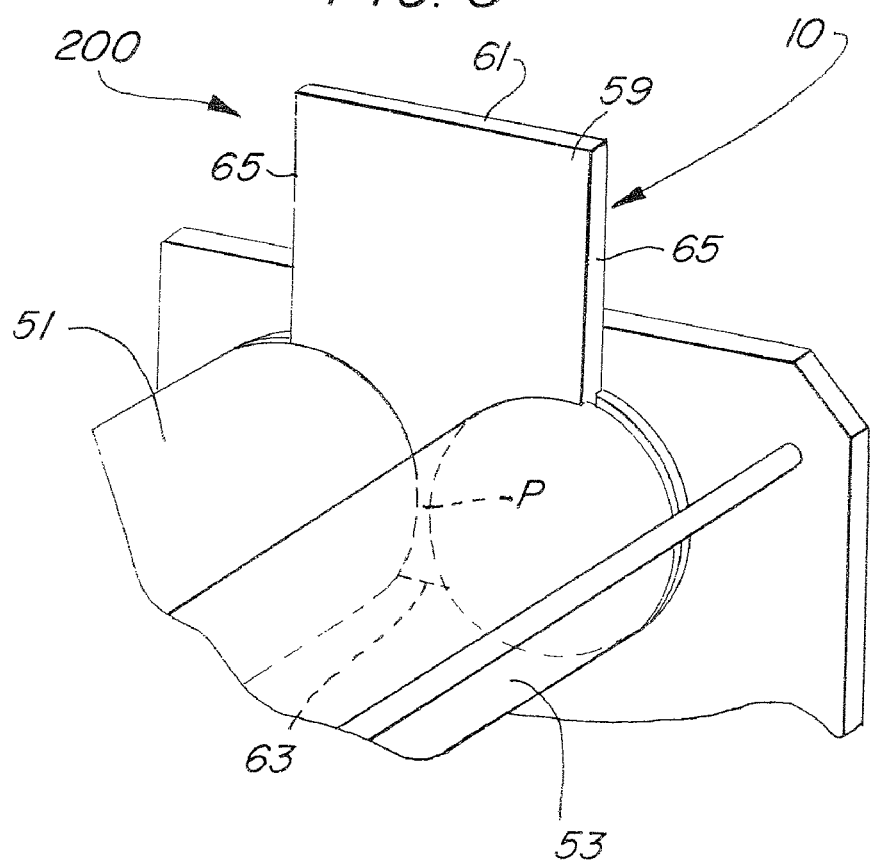

SADDLE AND SHEETING HEAD USING THE SAME

This application is a divisional of U.S. application Ser. No. 10/325,369, filed Dec. 20, 2002, now issued as U.S. Pat. No. 7,156,644.

BACKGROUND OF THE INVENTION

1. Field of the Invention

The present invention relates generally to sheeting head assemblies for processing food.

2. Description of Prior Art and Related Information

Sheeting heads are typically used for receiving and flattening dough into thin sheets out of which food products, such as tortillas and chips, are cut. A conventional sheeting head generally includes a pair of counter-rotating rollers disposed along a horizontal plane and placed beneath a container, also known as a hopper, which receives the dough. The hopper may include means for propelling the dough out of the container toward the rollers. The sidewalls of the container may extend downwardly and also serve as walls to which the rollers are coupled.

In conventional sheeting heads, the sticky, expanding dough can travel in between the rollers and the adjacent walls. Such undesirable dough can internally damage the machine by penetrating into the bearings and other machine parts. The prior art includes inserts shaped to conform to the round surfaces of the rollers and configured to fit therebetween. The inserts are affixed to plates, such as with conventional fasteners, which are interposed between the ends of the rollers and the sidewalls extending from the container. The problem with such inserts, however, is that the dough may travel in between the insert and the sidewall to which it is connected, thereby causing the sidewall to expand.

U.S. Pat. No. 5,558,885 effectively solves this problem with a tongue and groove structure. A tongued saddle is converges downwardly to a tip that is adapted to fit in the pinch point between the rollers. The tongue is adapted mate with grooves defined near the ends of the rollers. Hopper sidewalls, however, must be provided for supporting the insert. Furthermore, the insert must be mechanically coupled to the hopper sidewall using a variety of fastening mechanisms.

Therefore, what is needed is a sheeting head saddle that facilitates easier assembly and less expensive manufacturing.

SUMMARY OF THE INVENTION

The present invention provides structures and methods which overcome the deficiencies in the prior art.

In one aspect, a saddle is provided for a sheeting head assembly. The saddle comprises a first portion including a first concave edge, and a second portion including a second concave edge opposite to the first concave edge. The first concave edge has a substantially semi-circular shape and includes a first tongue. The second concave edge has a substantially semi-circular shape and includes a second tongue. The first portion is preferably integral with the second portion. Collectively, the first portion and the second portion form an hour-glass shaped body.

The first tongue is arched substantially to include both a first downwardly extending portion and a first upwardly extending portion. The second tongue is arched substantially to include both a second downwardly extending portion and a second upwardly extending portion. The first concave edge further comprises a substantially semi-circular first retracted edge. The second concave edge further comprises a substantially semi-circular second retracted edge.

In a further aspect, a saddle for a sheeting head comprises a top portion and a bottom portion. The top portion includes a first top concave edge, an opposite second top concave edge, and a first tongue defined on either the first top concave edge or the second top concave edge. The top concave edges converge downwardly. The bottom portion includes a first bottom concave edge, an opposite second bottom concave edge, and a second tongue defined on either the first bottom concave edge or the second bottom concave edge. The bottom concave edges diverge downwardly. The top portion is preferably integral with the bottom portion. The first top concave edge is preferably continuous with the first bottom concave edge. The second top concave edge is preferably continuous with the second bottom concave edge.

In another aspect, a sheeting head assembly is provided. The assembly comprises a first roller with a first groove, a second roller with a second groove, and a saddle fitted in between the rollers. The saddle comprises a first semi-circular, concave edge configured to mate with the first roller and a second semi-circular concave edge configured to mate the second roller. The first concave edge includes a first tongue configured to slidably fit in the first groove. The second concave edge includes a second tongue configured to slidably fit in the second groove. The first concave edge surrounds the first roller from a top and bottom direction. The second concave edge surrounds the second roller from a top and bottom direction.

The first roller is spaced apart from the second roller to define a pinch point. The saddle comprises a waist disposed in the pinch point. The saddle further comprises a lower portion extending downwardly from the waist. The first concave edge and the second concave edge are included in the lower portion. The first concave edge and the second concave edge in the lower portion diverge as the concave edges extend downwardly.

The first concave edge includes a first retracted concave edge configured to wrap around half a circumference of the first roller. The second edge includes a second retracted concave edge configured to wrap around half a circumference of the second roller. The assembly may include a sidewall disposed adjacent to a first pair of ends of the rollers. Since the saddle is self-fitting, the saddle may abut the sidewall without fasteners. Alternatively, the assembly may omit sidewalls altogether since the saddle is self-locking. The assembly may further comprise a hopper disposed above the rollers.

A method is also provided for preventing dough in a hopper from escaping into space between a pair of rollers and a side wall. The method comprises providing a pair of counter-rotating rollers, forming a groove adjacent to a first end of each roller such that the grooves of the rollers are aligned, coupling the rollers to a side wall, providing a saddle with a pair of concave edges, forming a tongue on each edge, and disposing the tongues in the grooves from a top and a bottom direction. The method further comprises abutting the side wall with the saddle without fasteners as well as fitting the saddle in between the rollers without any fasteners.

In summary, a saddle for a sheeting head includes a pair of semi-circular concave edges configured to seal a pair of rollers. The oppositely facing concave edges each include a tongue that fits in a corresponding groove in the roller and a retracted concave edge adapted to wrap around half the roller surface. The saddle includes a top portion wherein the concave edges downwardly converge, and a bottom portion wherein the concave edges downwardly diverge. A narrow waist is provided at the proximal-most position of the concave edges and adapted to fit in a pinch point between the rollers. A sheeting head assembly incorporating the saddle may include a sidewall to which the saddle need not be fastened. The self-locking characteristics of the saddle enable an assembly to omit sidewalls altogether.

The invention, now having been briefly summarized, may be better appreciated by the following detailed description and reference to the figures.

BRIEF DESCRIPTION OF THE DRAWINGS

FIG. 1 is a perspective view of a preferred embodiment of a saddle according to the invention;

FIG. 2 is a front elevation view of the preferred embodiment of the saddle;

FIG. 7 is a cross-sectional view of the preferred sheeting head assembly taken along lines 6'-6' of FIG. 4;

FIG. 8 is a perspective view of a further preferred embodiment of a sheeting head assembly without sidewalls;

DETAILED DESCRIPTION OF THE PREFERRED EMBODIMENTS

Figure 3:
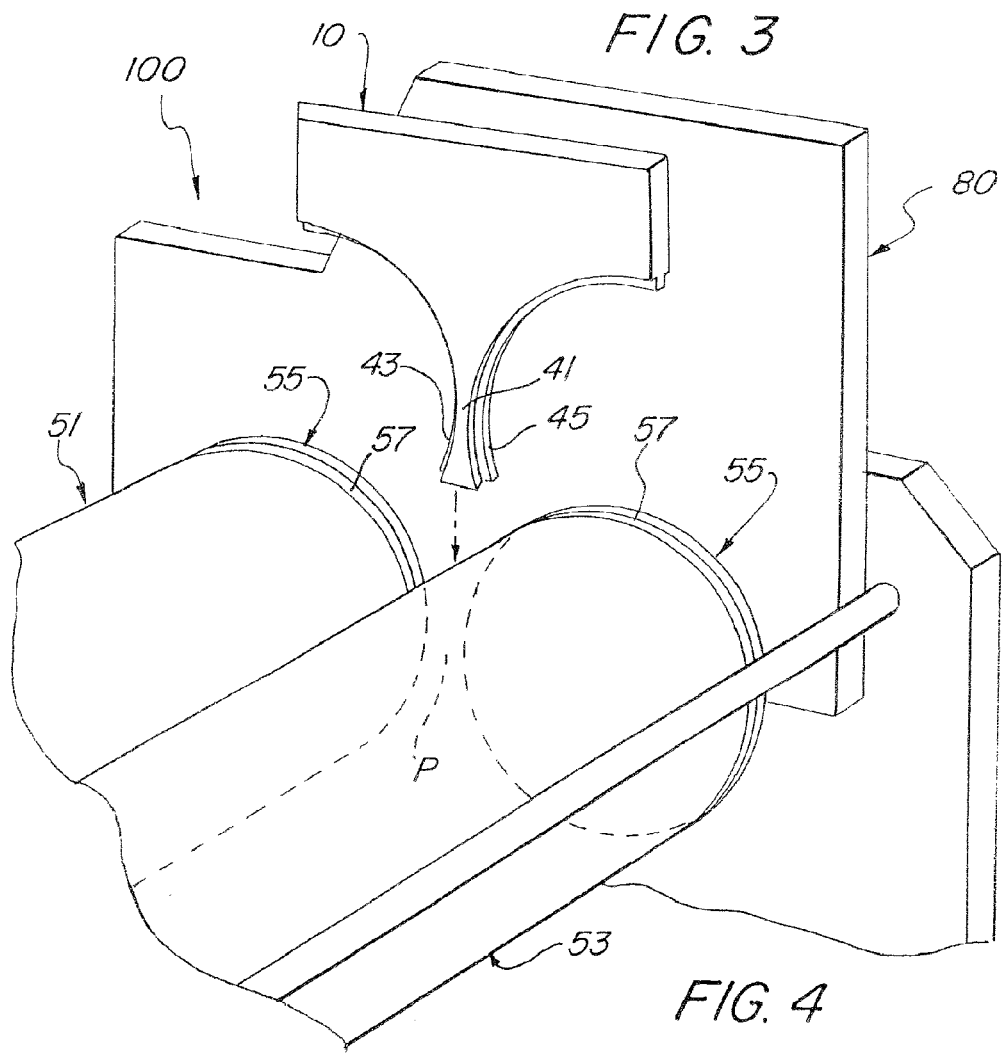
FIG. 3 is an exploded, partial view of a preferred embodiment of a sheeting head assembly.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

In FIGS. 1 and 2, a preferred embodiment of a saddle for a sheeting head is illustrated and designated generally by the reference numeral 10. The saddle 10 comprises a single, integral structure in the preferred embodiment. It is to be expressly understood, however, that saddle 10 may comprise a plurality of separate components coupled together. The saddle 10 comprises a first concave edge 20 and an oppositely facing second concave edge 22. Each edge 20, 22 comprises an arc that is at least greater than 90° and preferably less than 180°.

The first edge 20 is defined in a first half 24 of the saddle 10 while the second edge 22 is defined in a second half 26. Alternatively stated, the first edge 20 comprises a first top concave edge 28 defined in a top portion 31 of the saddle 10. The first top concave edge 28 is continuous with a first bottom concave edge 33 defined in a bottom portion 35 of the saddle. The second edge 22 also comprises a second top concave edge 37 defined in the top portion 31 of the saddle 10 that is continuous with a second bottom concave edge 39 defined in the bottom portion 35. The top concave edges 28, 37 converge as they extend downwardly to the narrowest section, or waist, 41 of the saddle 10. From the waist 41, the bottom concave edges 33, 39 diverge as they extend downwardly.

As a unitary structure, the top portion 31 is integral with the bottom portion 35 to generally form a hourglass shape. The first edge 20 and second edge 22 are adapted to receive a first and second roller, respectively, as further described below in connection with FIGS. 3-7.

Figure 6:
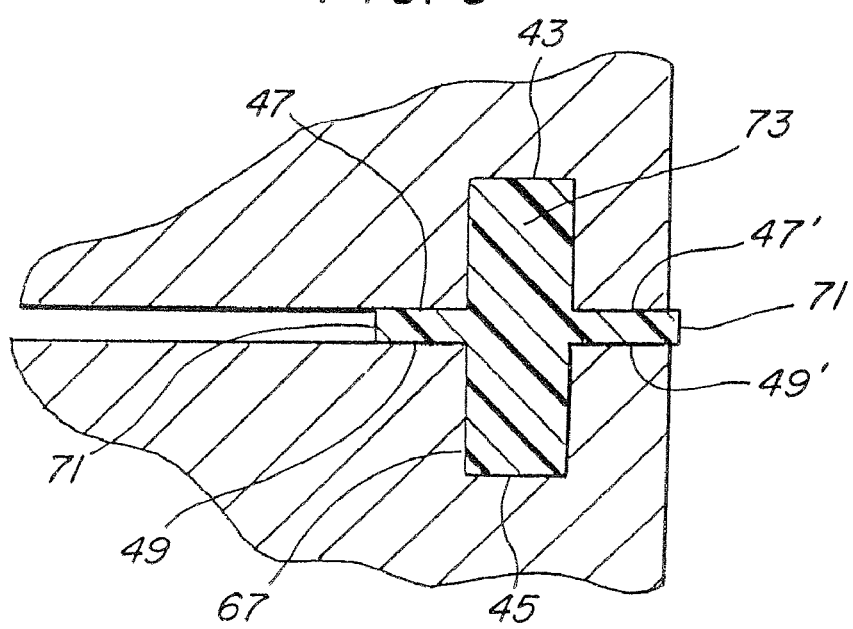
FIG. 6 is a cross-sectional view of the preferred sheeting head assembly taken along lines 5'-5' of FIG. 4.

In the preferred embodiment, the first concave edge 20 includes a first protruding tongue 43 disposed between a first pair of retracted edges 47, 47' as best shown in FIG. 6. Similarly, the second concave edge 22 comprises a second protruding tongue 45 disposed between a second pair of retracted edges 49, 49'. Since the tongues 43, 45 extend substantially along the lengths of their respective edges 20, 22, the tongues 43, 45 are thus concave and substantially semi-circular, defining an arc greater than 90° and preferably less than 180°.

FIG. 3 is an exploded, partial view of a sheeting head assembly 100 incorporating the saddles 10 according to the invention. The sheeting head assembly 100 preferably includes two saddles 10, namely, one adjacent to each pair of ends of the rollers 51, 53. For purposes of clarity, however, only one saddle 10 is illustrated here. The assembly 100 is illustrated in FIG. 3 as it might actually exist prior to installation of the saddle 10. In particular, the assembly 100 includes a first roller 51 and a second roller 53 disposed substantially along the same horizontal plan. The pair of rollers 51, 53 are configured to counter-rotate with respect to each other so as to form the rough clumps of dough disposed thereon into thin sheets out of which certain food products may be cut.

Each roller 51, 53 includes opposite ends 55. Grooves 57 are defined adjacent to the ends 55 of each roller 51, 53 and configured to mate with the tongues 43, 45 of the saddle 10. For ease of assembly, the grooves 57 are provided with identical configurations and placed along corresponding positions of the rollers 51, 53 such that the grooves 57 of the first roller 51 are aligned with grooves 57 of the second roller 53 when the rollers 51, 53 are brought into a proximate relationship.

In a preferred method of assembly, the rollers 51, 53 are spaced apart to provide room for placing the saddles 10. The narrowest gap between the rollers 51, 53 define a pinch point "P". In FIG. 3 where the rollers 51, 53 are spaced apart, an expanded, non-operative pinch point "P" is provided. Each saddle 10 is preferably disposed with its waist 41 located 2 to 3 inches beneath the pinch point "P".

Figure 4:
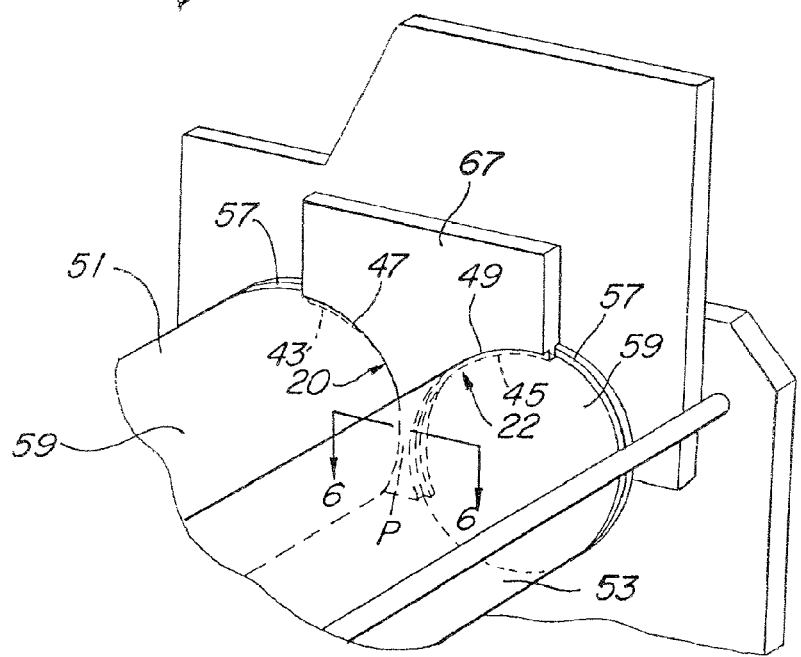
FIG. 4 is a perspective view of the preferred embodiment of the sheeting head assembly.
Figure 5:
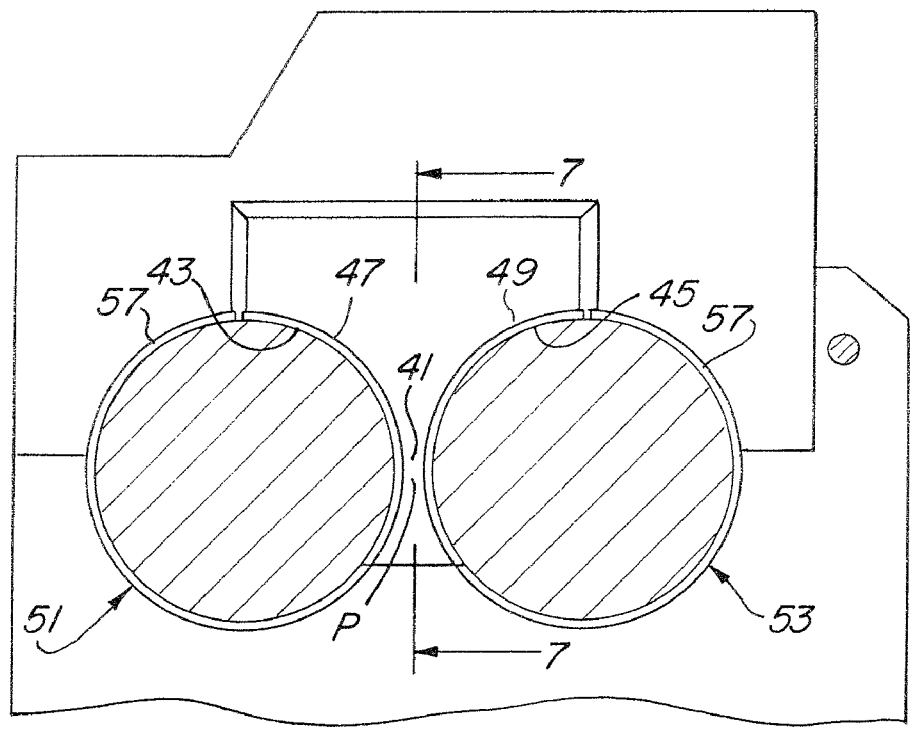
FIG. 5 is a front elevation view of the preferred embodiment of the sheeting head assembly.

In FIGS. 4 and 5, the rollers 51, 53 are brought together, thereby defining a narrow, or operative, pinch point "P". As the rollers 51, 53 are brought into a proximate relationship, the tongues 43, 45 of the saddle 10 are thus disposed in the grooves 57 of the rollers 51, 53, respectively. The retracted edges 47, 49 are contoured to wrap around the surfaces 59 of the rollers 51, 53. Unlike prior art saddles which only surround a top portion of the rollers, each concave edge 20, 22 surrounds the corresponding roller 51, 53 from a top direction and a bottom direction, thereby wrapping around approximately half the circumference of each roller 51, 53. It will be appreciated that the combination of the waist 41 and the bottom portion 35 extending beneath the pinch point "P" facilitates the self-locking and self-adjusting characteristics of the saddle 10 that is lacking in prior art saddles.

In FIG. 1, the saddle 10 comprises a top edge 61, bottom edge 63, and side edges 65 which are all preferably beveled. The saddle 10 further includes a roller facing surface 67 that is disposed medially with respect to the ends 55 of the rollers 51, 53 when installed, as best shown in the cross-sectional views of FIGS. 6 and 7.

With the rollers 51, 53 in an operative position as shown in FIGS. 7 and 8, the pinch point "P" is substantially narrow so as to flatten the dough into a thin sheet. Since the saddle 10 extends through this narrow pinch point "P", the waist 41 must accordingly be narrow enough to fit through the pinch point "P", but thick enough so as to not compromise the structural integrity of the saddle 10. To accomplish this, the waist 41 comprises thin portions 71 and a thick mid-portion 73. In FIG. 6, it will be appreciated that the retracted edges 47, 49 define the thin portions 71, one of which is substantially thin so as to fit in the operative pinch point "P". The rigidity of the saddle 10, however, is maintained by the thicker lateral portion 73 defined by the tongues 43, 45.

In the preferred embodiment shown in FIG. 3, the sheeting head assembly 100 comprises sidewalls 80 disposed adjacent to the ends 55 of the rollers 51, 53. With prior art saddles, sidewalls were necessary for supporting the saddles. It will be appreciated that with the self-fitting characteristics of the saddle 10 according to the invention, the saddle 10 need not be mechanically coupled to the sidewall 80 as with prior art saddles. The saddle 10 thus abuts the sidewall 80 without requiring any fasteners, though they may be optionally provided.

It will be further appreciated that the self-locking characteristics of the saddle 10 according to the invention enables sidewalls to be omitted altogether as shown in a further preferred embodiment 200 of a sheeting head assembly in FIG. 8. Without sidewalls, however, the saddle 10 must sufficiently restrain the large dough clumps placed on top of the rollers 51, 53 from escaping laterally. To accomplish this, the saddle 10 may be provided with a larger roller facing surface 59 by expanding the periphery 61, 63, 65. To save costs in manufacturing, it may be preferable to expand the roller facing surface 59 in the top portion 31 only since dough which gets pressed through the pinch point "P" will be sufficiently restrained by the tongue-and-groove feature of the assembly 100.

Figure 9:
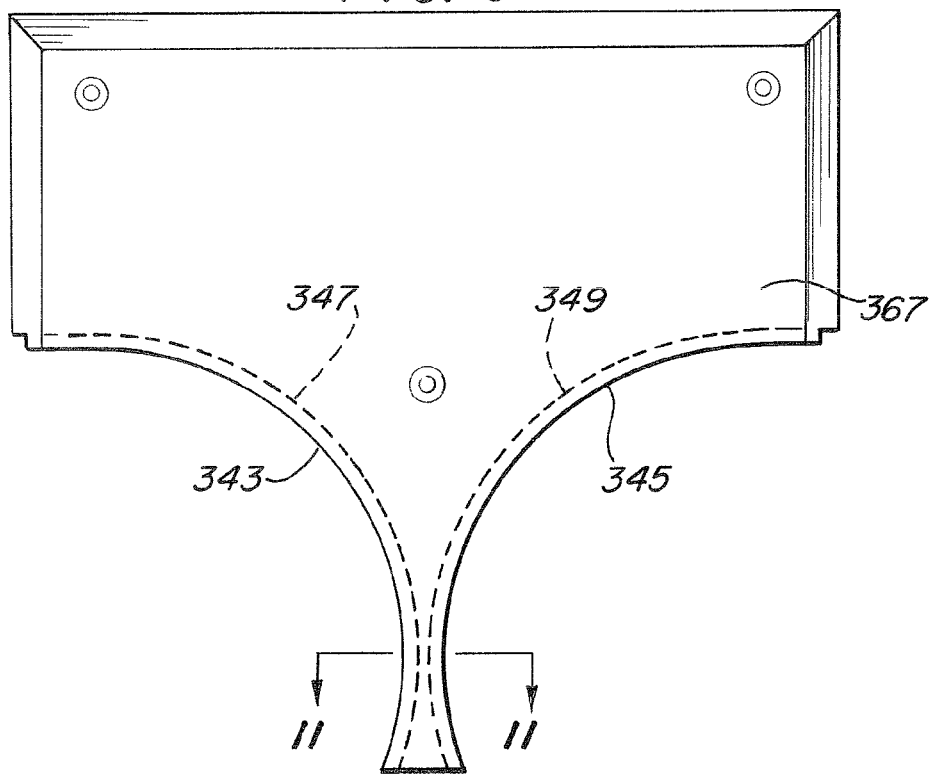
FIG. 9 is a front elevation view of a second preferred embodiment of a saddle.
Figure 10:
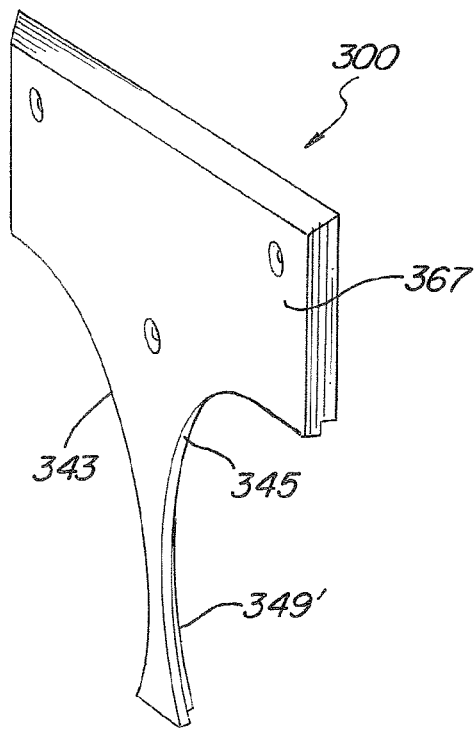
FIG. 10 is a perspective view of the second preferred embodiment of the saddle.
Figure 11:
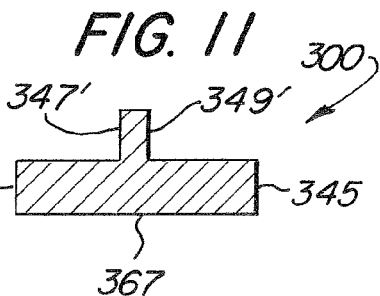
FIG. 11 is a cross-sectional view of the second preferred embodiment of the saddle taken along lines 11-11 of FIG. 9.

FIGS. 9-11 illustrate a second preferred embodiment 300 of a saddle. Unlike the first preferred embodiment 100 of the saddle shown in FIGS. 1-8, the second preferred embodiment 300 omits the front retracted edges 47, 49, as shown in FIG. 6, but includes the rear retracted edges 347', 349'. Thus, the second preferred saddle 300 has a roller face surface 367 that is flush with tongues 343, 345 whereas the roller facing surface 67 in the first preferred saddle 10 protrudes forwardly from the tongues 43, 45 as shown in FIG. 1.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A method for preventing dough in a hopper from escaping into space between a pair of rollers and a side wall while sheeting dough, the method comprising:
    providing a pair of counter-rotating rollers that define a pinch point;
    coupling the rollers to a side wall;
    sheeting dough into a thin sheet in the pinch point defined by the counter-rotating rollers; and
    preventing the dough from escaping into space between the counter-rotating rollers and the side wall with the additional steps of:
    forming a groove adjacent to a first end of each roller such that the grooves of the rollers are aligned;
    providing a saddle with first and second concave edges that mate with the first and second rollers, respectively, and extend downwardly below the pinch point;
    forming a tongue on each concave edge; and
    disposing the saddle within the pinch point between the rollers with the tongues extending into the grooves of the rollers from both a top and a bottom direction relative to the pinch point, the first concave edge and the second concave edge diverging from one another as the concave edges extend downwardly below the pinch point.

2. The method in claim 1, further comprising the step of abutting the saddle to the side wall.

3. The method in claim 2, further comprising the step of connecting the saddle to the side wall with a fastener.

* * * * *